United States Patent
Weder

(10) Patent No.: US 6,747,440 B2
(45) Date of Patent: Jun. 8, 2004

(54) VOLTAGE REGULATOR CIRCUIT FOR SMART CARD ICS

(75) Inventor: Uwe Weder, Au/Hallertau (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/461,818

(22) Filed: Jun. 6, 2003

(65) Prior Publication Data

US 2003/0222632 A1 Dec. 4, 2003

Related U.S. Application Data

(63) Continuation of application No. PCT/DE01/04366, filed on Nov. 21, 2001.

(30) Foreign Application Priority Data

Dec. 6, 2000 (DE) .................................. 100 60 651

(51) Int. Cl.$^7$ .............................................. G05F 1/569
(52) U.S. Cl. ....................................... 323/276; 323/303
(58) Field of Search ................................ 323/273, 275, 323/276, 282, 285, 299, 303

(56) References Cited

U.S. PATENT DOCUMENTS

| | | | | |
|---|---|---|---|---|
| 5,036,269 A | * | 7/1991 | Murari et al. ................ | 323/266 |
| 6,184,669 B1 | * | 2/2001 | Matsuo ........................ | 323/303 |
| 6,300,749 B1 | * | 10/2001 | Castelli et al. ............... | 323/273 |
| 6,320,363 B1 | * | 11/2001 | Oglesbee et al. ............ | 323/303 |

* cited by examiner

Primary Examiner—Jeffrey Sterrett
(74) Attorney, Agent, or Firm—Laurence A. Greenberg; Werner H. Stemer; Gregory L. Mayback

(57) ABSTRACT

The circuit contains a series regulator with an FET. A capacitor and a further FET, which is provided as a transfer gate and is driven by the POR signal, are connected in series between the source terminal, to which the external supply voltage is applied, and the gate connection. When the external voltage is applied, the FET opens, with the transfer gate switched on, corresponding to the charging of the capacitor which now takes place. Because this charging process takes a certain amount of time, overshoots in the internal voltage are prevented.

4 Claims, 2 Drawing Sheets

US 6,747,440 B2

VOLTAGE REGULATOR CIRCUIT FOR SMART CARD ICS

CROSS-REFERENCE TO RELATED APPLICATION

This application is a continuation of copending International Application No. PCT/DE01/04366, filed Nov. 21, 2001, which designated the United States and was not published in English.

BACKGROUND OF THE INVENTION

Field of the Invention

The present invention relates to a voltage regulator circuit for the field of smart card IC fabrication.

Integrated circuits with different voltage domains (external and internal voltages) normally contain voltage regulator circuits, for example as described on page 10 of the document "LP2954/LP2954A 5V and Adjustable Micropower Low-Dropout Voltage Regulators" from the National Semiconductor Corporation dated June 1999. The operating voltage for the integrated circuit is the potential difference between the ground connection (VSS) and the supply potential. This voltage, which is referred to in the following text as the internal supply voltage $VDD_{int}$, is produced from an external supply voltage $VDD_{ext}$ by using a complex voltage regulator circuit, which is formed by a series regulator. In order to simplify the explanation, the series regulator in the voltage regulator circuit specified according to the prior art is shown in FIG. 1 in a circuit configuration which illustrates the major method of operation of this circuit for driving a series regulation transistor.

The circuit that is illustrated in FIG. 1 has a series regulator L that has a series regulation transistor and that converts the external supply voltage $VDD_{ext}$ to the internal supply voltage $VDD_{int}$. An electrical potential, which is provided for controlling the voltage conversion process, is applied to the gate connection of the series regulation transistor M1, as the regulator terminal R of the series regulator. This signal is a regulator-internal analog signal. The internal supply voltage $VDD_{int}$ is provided for supplying voltage to the smart card IC IC. The core capacitor $C_{core}$ is also shown, in order to explain the operation of the circuit. The circuit of the series regulator is normally considerably more complex, and differs from the illustrated simple example whose functional principle is the same.

The voltage regulator circuit illustrated in FIG. 1 has the disadvantage that, when the external supply voltage $VDD_{ext}$ is switched on quickly, overshoots occur in the internal supply voltage $VDD_{int}$ that are no longer tolerable beyond a specific integration level because they lead to damage to the thin gate oxide of the transistors that are connected to $VDD_{int}$. FIG. 4 shows the voltage profiles of $VDD_{int}$ and $VDD_{ext}$, plotted against time, for the switching-on process.

In addition, the total number of only five connecting contact surfaces, which are normally referred to as pads, ($VDD_{ext}$, VSS, Clock, IO, Reset) and their switching-on sequence, in accordance with the ISO/GSM Standard, are also specified for smart card ICs. There is thus no possible way to achieve a desired transient response by providing additional pads or other switching-on sequences.

SUMMARY OF THE INVENTION

It is accordingly an object of the invention to provide a voltage regulator circuit for smart card ICs that overcomes the hereinafore-mentioned disadvantages of the heretofore-known devices of this general type and that is as simple as possible for smart card ICs, and in which the problem of overshooting during the switching-on process does not occur.

With the foregoing and other objects in view, there is provided, in accordance with the invention, a voltage regulator circuit according to the invention with a series regulator that is known per se and is provided in order to produce an internal supply voltage $VDD_{int}$ from an external supply voltage $VDD_{ext}$. The voltage regulator circuit has a capacitor and a field-effect transistor connected in series between a connection of the external supply voltage $VDD_{ext}$ and a regulator terminal of the series regulator. The field-effect transistor is provided as a transfer gate. An electrical potential, which varies in accordance with a control signal for a smart card IC, is provided for this transfer gate. In particular, the series regulator has a series regulation transistor that is configured with its source and drain terminals in series between the external supply voltage $VDD_{ext}$ and the internal supply voltage $VDD_{int}$, and whose gate connection is the regulator terminal of the series regulator, or is at least connected to the regulator terminal. The potential that is applied to the gate of the series regulation transistor can be regulated.

Other features that are considered as characteristic for the invention are set forth in the appended claims.

Although the invention is illustrated and described herein as embodied in a voltage regulator circuit for smart card ICs, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
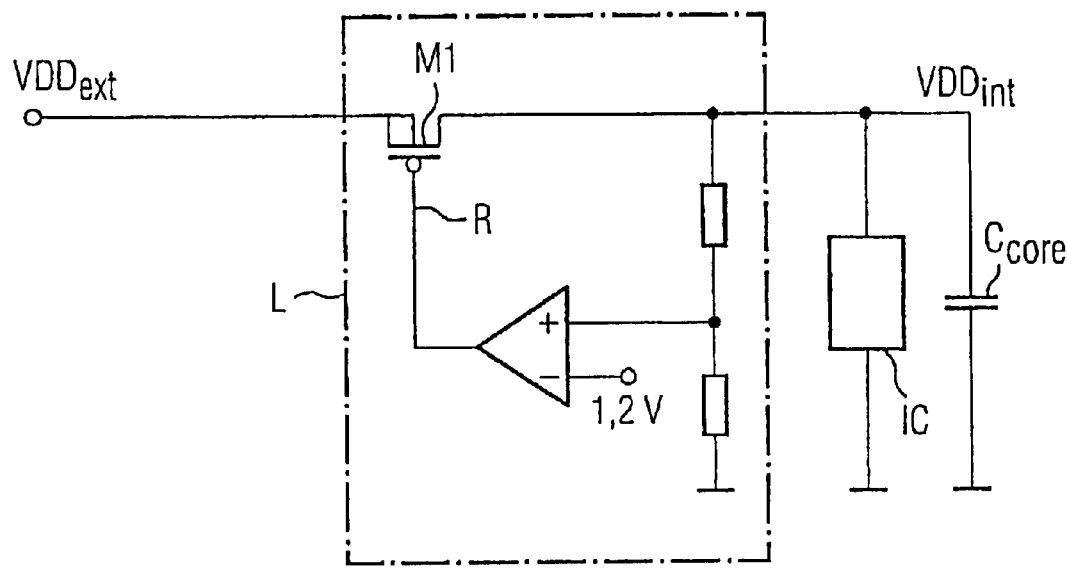
FIG. 1 is a circuit diagram showing the voltage regulator circuit according to the prior art.
Figure 2:
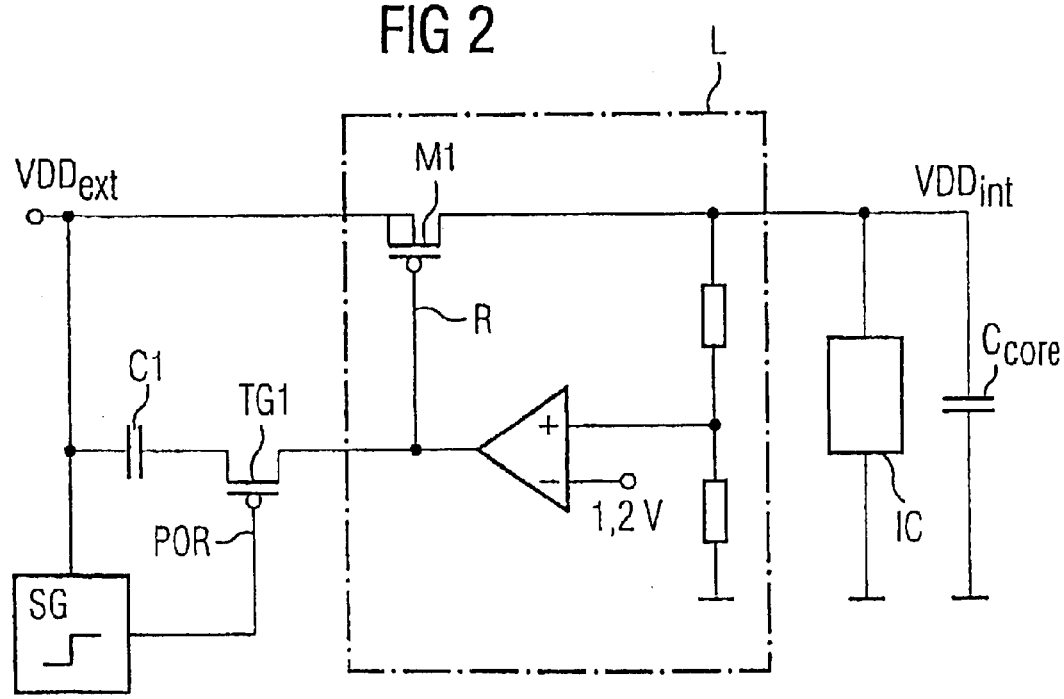
FIG. 2 is a circuit diagram showing the preferred embodiment of a voltage regulator circuit according to the invention.

Referring now to the figures of the drawings in detail and first, particularly to FIG. 2 thereof, there is shown an exemplary embodiment of the voltage regulator circuit according to the invention, in which the series regulator L is illustrated in order to explain the method of operation of the circuit as shown in FIG. 1. Modifications to the series regulator result in corresponding exemplary embodiments of the circuit according to the invention that do not need to be described in their own right. A capacitor C1 and a transfer gate TG1, which is formed by a field-effect transistor, are connected in series between the source terminal and the gate of the series regulation transistor M1, whose source-drain path is used for voltage conversion. The other circuit components correspond to a conventional circuit, for example as illustrated in FIG. 1.

Figure 3:
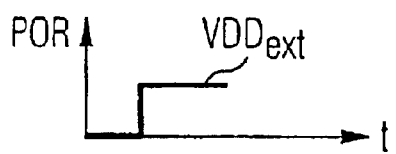
FIG. 3 is a graph plotting the POR signal versus time.
Figure 4:
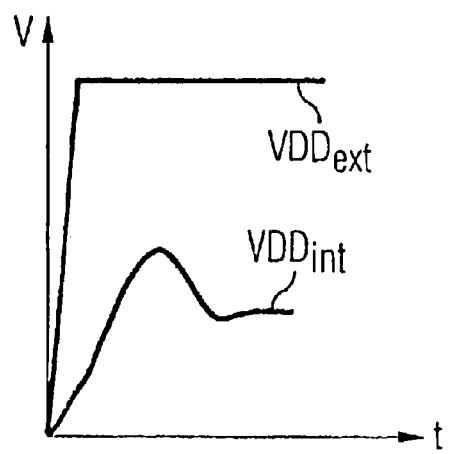
FIG. 4 is a graph plotting $VDD_{int}$ and $VDD_{ext}$ for the circuit shown in FIG. 1 versus time.

The transfer gate is driven by a signal that is produced by a signal generator SG, which is provided, for this purpose, as a POR (Power On Reset) signal and which typically has a time profile as illustrated in the diagram in FIG. 3. This POR signal is a digital signal and has two values, namely the ground potential or VSS and the external supply voltage $VDD_{ext}$. It is produced independently of the circuit part, which is provided according to the invention, for a smart card IC and is used for a switching-on process.

Figure 5:
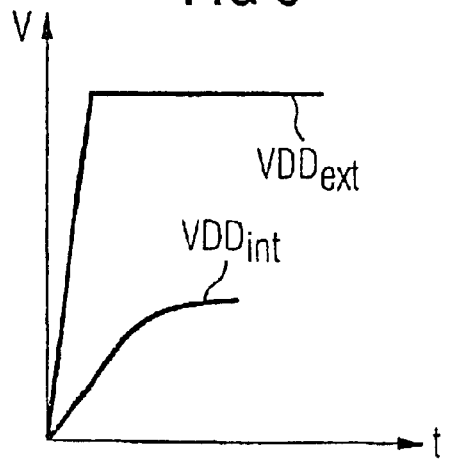
FIG. 5 is a graph plotting $VDD_{int}$ and $VDD_{ext}$ for the circuit shown in FIG. 2.

At the moment of being switched on, the capacitor C1 is discharged. When the external supply voltage $VDD_{ext}$ is applied, the series regulation transistor M1 opens, with the transfer gate switched on, corresponding to the charging of the capacitor C1 which now takes place. Since this charging process takes a certain amount of time, the series regulator L is thus opened only slowly. The circuit elements C1 and TG1 according to the invention, as components which are essential to the invention, are provided irrespective of the detailed configuration of the series regulator. They are preferably constructed to have a time constant that is longer than the (internal) voltage regulator time constant. This means that the (internal) core capacitor $C_{core}$ is also charged only slowly, thus preventing the internal supply voltage $VDD_{int}$ from overshooting. In this circuit, the time voltage profiles thus correspond to the curves illustrated in the diagram in FIG. 5.

After the end of the internal transient process, the transfer gate is permanently closed by the signal POR. Since the additional capacitor C1 depends only on the external supply voltage $VDD_{ext}$ and the transfer gate remains closed throughout the entire process, the dynamic response of the smart card IC IC is not influenced by the voltage regulator circuit. The steady-state and dynamic current consumptions during operation also remain uninfluenced. The reduction in the surge current level that occurs has the advantage that this reduces electromigration.

I claim:

1. A voltage regulator circuit for producing an internal supply voltage from an external supply voltage in a smart card IC, comprising:

a series regulator circuit including:

a series regulation transistor having a gate terminal, a source terminal, and a drain terminal, said source and said drain terminals being disposed in series between an external supply voltage and an internal supply voltage; and a regulator terminal for regulating a potential applied to said gate terminal of said series regulation transistor; and a capacitor and a transfer gate connected in series between the external supply voltage and said regulator terminal, said transfer gate being a field-effect transistor;

said transfer gate to be controlled by a variable electrical potential, said transfer gate being opened by the variable electrical potential during a transient process to charge said capacitor, and said transfer gate being closed by the variable electrical potential after a transient problem ends.

2. The voltage regulator circuit according to claim 1, wherein said transfer gate is closed permanently by the variable electrical potential after the transient problem ends.

3. The voltage regulator circuit according to claim 1, further comprising a circuit part producing a voltage signal assuming two different values successively in time, said circuit part being connected to said transfer gate.

4. The voltage regulator circuit according to claim 3, wherein the voltage signal is a power on/reset signal corresponding to a control signal for a smart card IC.

* * * * *

UNITED STATES PATENT AND TRADEMARK OFFICE
CERTIFICATE OF CORRECTION

PATENT NO. : 6,747,440 B2
DATED : June 8, 2004
INVENTOR(S) : Uwe Weder

It is certified that error appears in the above-identified patent and that said Letters Patent is hereby corrected as shown below:

Column 4,
Line 26, should read as follows:
-- sient process ends. --
Line 29, should read as follows:
-- variable electrical potential after the transient process ends. --

Signed and Sealed this

Twenty-third Day of November, 2004

JON W. DUDAS
*Director of the United States Patent and Trademark Office*